United States Patent
Pateromichelakis et al.

(10) Patent No.: US 11,722,864 B2
(45) Date of Patent: Aug. 8, 2023

(54) ENTITY, NETWORK, AND USER EQUIPMENT FOR A V2X SERVICE AS WELL AS V2X APPLICATION

(71) Applicant: Huawei Technologies Co., Ltd., Shenzhen (CN)

(72) Inventors: Emmanouil Pateromichelakis, Munich (DE); Chan Zhou, Munich (DE); Konstantinos Samdanis, Munich (DE); Markus Martin Dillinger, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/997,636

(22) Filed: Aug. 19, 2020

(65) Prior Publication Data
US 2020/0413235 A1 Dec. 31, 2020

Related U.S. Application Data

(63) Continuation of application No. PCT/EP2018/054626, filed on Feb. 26, 2018.

(51) Int. Cl.
*H04W 4/40* (2018.01)
*H04W 4/029* (2018.01)
*H04W 28/02* (2009.01)

(52) U.S. Cl.
CPC ............. *H04W 4/40* (2018.02); *H04W 4/029* (2018.02); *H04W 28/0247* (2013.01); *H04W 28/0268* (2013.01)

(58) Field of Classification Search
None
See application file for complete search history.

(56) References Cited

U.S. PATENT DOCUMENTS 8,190,191 B2 5/2012 Livet et al.
2015/0016299 A1* 1/2015 Zhang .................. H04L 67/14
370/253

(Continued)

FOREIGN PATENT DOCUMENTS

CN 101242568 A 8/2008
CN 102396275 A 3/2012

(Continued)

OTHER PUBLICATIONS

"3rd Generation Partnership Project; Technical Specification Group Services and System Aspects; Enhancement of 3GPP support for V2X scenarios; Stage 1 (Release 15)," 3GPP TS 22.186 V15.2.0, pp. 1-16, 3rd Generation Partnership Project, Valbonne, France (Sep. 2017).

(Continued)

*Primary Examiner* — Adolf Dsouza
(74) *Attorney, Agent, or Firm* — Leydig, Voit & Mayer, Ltd.

(57) ABSTRACT

Controlling a vehicle-to-everything, V2X, service for one or more user equipments is described. An apparatus is, for example, configured to determine a requirement for the V2X service based on a network parameter of a network and/or an application requirement of a V2X application of the V2X service. The requirement includes at least one of the group consisting of: a quality of service (QoS), a mode of operation, and a resource requirement. The apparatus is configured to transmit an adaptation request message comprising the requirement for an adaptation to the requirement.

23 Claims, 9 Drawing Sheets

(56) References Cited

U.S. PATENT DOCUMENTS

| | | | |
|---|---|---|---|
| 2017/0288886 A1* | 10/2017 | Atari | H04L 47/20 |
| 2017/0317894 A1 | 11/2017 | Dao et al. | |
| 2017/0332282 A1 | 11/2017 | Dao | |
| 2020/0092685 A1* | 3/2020 | Fehrenbach | H04W 4/46 |

FOREIGN PATENT DOCUMENTS

| | | |
|---|---|---|
| CN | 103476091 A | 12/2013 |
| CN | 106102022 A | 11/2016 |
| CN | 106304404 A | 1/2017 |
| CN | 106341839 A | 1/2017 |
| KR | 20180033589 A | 4/2018 |
| RU | 2599953 C2 | 10/2016 |
| WO | 2016148399 A1 | 9/2016 |
| WO | 2017048109 A1 | 3/2017 |
| WO | 2017180093 A1 | 10/2017 |
| WO | 2019081026 A1 | 5/2019 |
| WO | 2019081027 A1 | 5/2019 |

OTHER PUBLICATIONS

"3rd Generation Partnership Project; Technical Specification Group Services and System Aspects; Service requirements for V2X services; Stage 1 (Release 14)," 3GPP TS 22.185 V14.3.0, pp. 1-14, 3rd Generation Partnership Project, Valbonne, France (Mar. 2017).

"3rd Generation Partnership Project; Technical Specification Group Services and System Aspects; Enhancement of 3GPP support for V2X scenarios; Stage 1 (Release 15)," 3GPP TS 22.186 V15.0.0, pp. 1-16, 3rd Generation Partnership Project, Valbonne, France (Mar. 2017).

"3rd Generation Partnership Project; Technical Specification Group Services and System Aspects; System Architecture for the 5G System; Stage 2 (Release 15)," 3GPP TS 23.501 V15.0.0, pp. 1-181, 3rd Generation Partnership Project, Valbonne, France (Dec. 2017).

"3rd Generation Partnership Project;Technical Specification Group Services and System Aspects; Procedures for the 5G System; Stage 2 (Release 15)," 3GPP TS 23.502 V15.0.0, pp. 1-258, 3rd Generation Partnership Project, Valbonne, France (Dec. 2017).

"3rd Generation Partnership Project; Technical Specification Group Services and System Aspects; Study on Architecture for Next Generation System (Release 14)," 3GPP TR 23.799 V14.0.0, pp. 1-522, 3rd Generation Partnership Project, Valbonne, France (Dec. 2016).

"New WID for study on application layer support for V2X services," 3GPP TSG-SA WG6 Meeting #19, Dubrovnik, Croatia, S6-171481 (revision of S6-171240, 399), pp. 1-3, 3rd Generation Partnership Project, Valbonne, France (Oct. 9-13, 2017).

"SDN architecture" Issue 1, ONF TR-502, Open Networking Foundation, total 68 pages (Jun. 2014).

"3rd Generation Partnership Project; Technical Specification Group Services and System Aspects; Study on application layer support for V2X services; (Release 16)," 3GPP TR 23.795 V0.1.0, pp. 1-16, 3rd Generation Partnership Project, Valbonne, France (Jan. 2018).

"3rd Generation Partnership Project; Technical Specification Group Services and System Aspects; Policy and charging control architecture (Release 15)," 3GPP TS 23.203 V15.1.0, pp. 1-261, 3rd Generation Partnership Project, Valbonne, France (Dec. 2017).

"3rd Generation Partnership Project; Technical Specification Group Services and System Aspects; Study on Machine-Type Communications (MTC) and other mobile data applications communications enhancements(Release 12)," 3GPP TR 23.887 V12.0.0, pp. 1-151, 3rd Generation Partnership Project, Valbonne, France (Dec. 2013).

"3rd Generation Partnership Project; Technical Specification Group Core Network and Terminals; Policy and Charging Control (PCC); Reference points (Release 15)," 3GPP TS 29.212 V15.1.0, pp. 1-281, 3rd Generation Partnership Project, Valbonne, France (Dec. 2017).

"Surface Vehicle Recommended Practice, (R) Taxonomy and Definitions for Terms Related to Driving Automation Systems for On-Road Motor Vehicle," J3016, SAE International (Jun. 2018).

* cited by examiner

ENTITY, NETWORK, AND USER EQUIPMENT FOR A V2X SERVICE AS WELL AS V2X APPLICATION

CROSS-REFERENCE TO RELATED APPLICATIONS

This application is a continuation of International Application No. PCT/EP2018/054626, filed on Feb. 26, 2018, the disclosure of which is hereby incorporated by reference in its entirety.

TECHNICAL FIELD

The present disclosure generally relates to the field of communication network technology. Particularly, the present disclosure relates to an entity for controlling a vehicle-to-everything (V2X) service, a network for supporting a V2X service, a user equipment for operating a V2X application of a V2X service, and corresponding methods. Moreover, the present disclosure particularly relates to a V2X application and a vehicle.

BACKGROUND

In mobile communications, vehicle-to-everything (V2X) communication relates to communication from and to vehicles. V2X communication comprises transmitting information from a vehicle to another entity, and vice versa.

Enhanced V2X (eV2X) services or use cases like platooning and advanced driving are presented in 3GPP TS 22.186, e.g. in 3GPP TS 22.186 V15.2.0 (2017-09). Related to the eV2X use cases, categories of requirements (CoR) and Levels of Automations (LoA) are specified for eV2X services. The eV2X services comprise support for both safety and non-safety scenarios. Safety-related scenarios are e.g. automated driving, vehicle platooning, etc. Non-safety-related scenarios are e.g. mobile high data rate entertainment, mobile hotspot/office/home, dynamic digital map update etc.

The following five CoRs support eV2X scenarios: General Aspects (interworking, communication-related requirements valid for all V2X scenarios), Vehicle Platooning, Advanced Driving, Extended Sensors and Remote Driving.

For example, Vehicle Platooning enables vehicles to dynamically form a group travelling together. All the vehicles in the platoon receive periodic data from the leading vehicle, in order to carry on platoon operations. This information allows the distance between vehicles to become extremely small, i.e., the gap distance translated to time can be very low (sub second). Platooning applications may allow the vehicles following to be autonomously driven.

Advanced Driving enables semi-automated or fully-automated driving. Longer inter-vehicle distance is assumed. Each vehicle and/or RSU shares data obtained from its local sensors with vehicles in proximity, thus allowing vehicles to coordinate their trajectories or maneuvers. In addition, each vehicle shares its driving intention with vehicles in proximity. The benefits of this use case group are safer traveling, collision avoidance, and improved traffic efficiency.

The LoA reflects different operational aspects related with eV2X and affects the demands for system performance requirements. The LoAs can be: No Automation (0), Driver Assistance (1), Partial Automation (2), Conditional Automation (3), High Automation (4), and Full Automation (5). These five LoAs are in accordance with SAE International, "AUTOMATED DRIVING LEVELS OF DRIVING AUTOMATION ARE DEFINED IN NEW SAE INTERNATIONAL STANDARD J3016", December 2016.

The eV2X services are special services with specific latency and reliability requirements, particularly with ultra low latency and high reliability requirements. Certain eV2X scenarios may also require the support of high data rates. The following factors distinguish the eV2X services from other services, particularly from other 5G (5th generation mobile network) services:

Safety related eV2X scenarios are delay- and reliability-critical, while the rate (and thus the resource) requirement may vary for each CoR and LoA, since they may support different payloads (from 300 B to 12000 B) under the strict delay requirement. Also, different CoR and LoA combinations may impose different QoS demands: this may even be true for the same service, e.g. platooning. This poses additional challenges for maintaining the desired QoS by 5G System (5GS) from numerous services.

Some eV2X scenarios require by nature group communications: this means that a request for resources may involve a set of users, possibly in different cells or even different systems. Hence, QoS and resource allocations may need to apply simultaneously for all users or for a specified set of users. This shall apply simultaneously regardless of the fact that 5GS may accommodate other requests with significant load. Furthermore, if the request is not successful for the entire group of vehicles, the request cannot result in any resources being held temporarily, as those resources may need to be available to other requests. To this end, it may be also necessary to queue for resources while resolving potential congestions.

An eV2X application, due to the different LoA options (1-5) and different modes of operation (e.g. unicast vs multicast broadcast), may require to change the QoS and resource demand rapidly due to unpredictable network conditions. This may, e.g., happen for adjustment from LoA 1 to 5. Therefore, the 5GS needs to be able to adapt fast and decide accordingly whether it can fulfil the new requirement jointly for all users or for a specified set of users.

Given the aforementioned considerations, the increased complexity of scenarios, and the wider variety of requirements, new mechanisms are required to address the following issues:

How an eV2X application request can be translated to network requirements (e.g. QoS, resource, mode of operation request, etc.) jointly for all users (or a specified set of users) of the same service.

How to indicate a need of LoA alternation and make the eV2X Application capable of deciding to adjust the Service Level Agreement (SLA) and/or LoA for single or specified sets of users of the same service, by monitoring the QoS/resource situation in the network.

How one or more eV2X Applications will be able to negotiate the SLA, desired QoS requirement, and/or mode of operation, if the network cannot fulfil the initial eV2X Application requirements with respect to a single or specified sets of users, so as to ensure service continuity.

SUMMARY

Having recognized the above-mentioned disadvantages and problems, the present disclosure aims to improve the state of the art. In particular, an objective of the present disclosure is to address the above-mentioned issues.

According to a first aspect, the disclosure relates to an entity for controlling a vehicle-to-everything, V2X, service for one or more user equipments. The entity is configured to determine a requirement for the V2X service based on a network parameter of a network and/or an application requirement of a V2X application of the V2X service. The requirement comprises at least one of a quality of service, QoS, a mode of operation, and a resource requirement. The entity is further configured to transmit an adaptation request message comprising the requirement for an adaptation to the requirement.

An adaptation can affect a requirement for the V2X service, for a V2X application of the V2X service, or for another service/application, in particular a service/application that competes with the V2X service for resources. Additionally or alternatively, an adaptation can affect a parameter of one or more of the aforementioned services or applications.

Particularly, the entity can control the V2X service in a system comprising a network and the one or more user equipments. Particularly, the V2X service can be a V2X service for one or more user equipments, wherein the user equipments can be clustered to a group of user equipments.

Thereby, a change of the application requirements of a V2X application of the V2X service can be taken into consideration by the entity to determine a corresponding change in QoS, mode of operation, or resource requirement. The transmission of the adaptation request message advantageously allows for an adaptation to the changed application requirements. This adaptation can, e.g., be carried out by the network or by a user equipment. A similar advantage is achieved after a change of the network parameter.

In other words, depending on a change or update of the application requirement, the entity can advantageously translate this change of application requirement into appropriate QoS requirements or mode of operation or resource requirement for groups of user equipments that are affected by this change of application requirement.

According to an implementation of the first aspect, the entity is configured to transmit the adaptation request message to the network for requesting the network to adapt to the determined requirement.

Thereby, this is advantageous if the entity resides, e.g., in the network or in an application domain connected between the network and an application server running a V2X application of the V2X service. Indeed, the transmission of the adaptation request message to the network allows for the network to adapt to a change of the network parameter or to a change of the application requirements.

According to a further implementation of the first aspect, the entity is configured to receive the application requirement from the V2X application, receive, in response to the transmitted adaptation request message, an acknowledgment message from the network, and transmit, in response to the received acknowledgment message, a notification message to the V2X application.

Thereby, the V2X application that has transmitted the application requirement to the entity, i.e. that has triggered the adaptation, can be aware of the carried out adaptation when it receives the notification message transmitted by the entity.

According to a further implementation of the first aspect, the entity is configured to receive context information of a radio access network, RAN, and/or receive events for the RAN.

Thereby, the entity is aware of the RAN context information and/or the RAN events, said RAN events being, in particular, real-time events for the RAN. In particular, the RAN can be the RAN of the network. Accordingly, the entity can monitor said context information and/or events for the RAN. Also, the entity can advantageously inform, e.g., a V2X application of the V2X service in case of a change of said context information and/or events for the RAN.

According to a further implementation of the first aspect, the entity is configured to monitor the context information and/or events for the RAN, and transmit a monitoring report to a V2X application of the V2X service based on the monitored context information and/or the monitored events for the RAN.

Thereby, the V2X application is aware of the RAN context information and the RAN events, said RAN events being, in particular, real-time events for the RAN. Accordingly, the V2X application can react to said information and said events by, e.g., triggering a group change request.

According to a further implementation of the first aspect, the entity is configured to receive vehicle location information from the V2X application. The entity is configured to monitor the vehicle location information. The entity is configured to transmit the monitoring report to the V2X application of the V2X service based on the monitored context information, the monitored events for the RAN, and the monitored vehicle location information.

Thereby, the entity receives accurate location information regarding the V2X application. Accordingly, it is possible to perform an improved group monitoring. The received vehicle location information can be the vehicle location information for the one or more user equipments.

According to a further implementation of the first aspect, the entity is configured to receive context information of a radio access network, RAN, and/or receive events for the RAN and/or events for a core network entity, and/or receive application information from a V2X application of the V2X service. The entity is configured to configure extended QoS rules for different states of the V2X service. The entity is configured to transmit the configured extended QoS rules to the core network entity and to the one or more user equipments.

Thereby, the core network entity and the one or more user equipments are preferably involved in running or operating a V2X application of the V2X service. Advantageously, the core network entity and the one or more user equipments can receive specific rules in the form of the extended QoS rules for different states of the V2X service, so as to be able to apply a fast adaptation based on these configured extended QoS rules. In particular, the RAN may be the RAN of the network and the core network entity may be an entity of the core network of the network.

According to a further implementation of the first aspect, the entity is located in the network, in an application domain, or in a vehicle that comprises one of the user equipments.

Thereby, it is advantageous that the adaptation can affect a requirement for a service/application located in the network, in an application domain, or in a vehicle. The service/application can be, e.g., the V2X service, the V2X application of the V2X service, or another service/application.

According to a further implementation of the first aspect, the entity is configured to transmit the adaptation request message to one of the user equipments for requesting this user equipment to adapt to the requirement.

Thereby, it is advantageous that the adaptation to the requirement can be carried out locally at the user equipment without the use of an interface to a network.

According to a further implementation of the first aspect, the user equipments are clustered to a group of user equipments, and the adaptation request message comprises an indication of a subset of the group of user equipments, so as to request the adaptation to the requirement for the subset.

Thereby, the entity can request an adaptation to the determined requirement only for the subset of user equipments and not for the whole group of user equipments.

According to a second aspect, the disclosure relates to a method for controlling a vehicle-to-everything, V2X, service for one or more user equipments. The method comprises determining a requirement for the V2X service based on a network parameter of the network and/or an application requirement of a V2X application of the V2X service. The requirement comprises at least one of a quality of service, QoS, a mode of operation, and a resource requirement. The method further comprises transmitting an adaptation request message comprising the requirement for an adaptation to the requirement.

Thereby, a change of the application requirements of a V2X application of the V2X service can be taken into consideration to determine a corresponding change in QoS, mode of operation, or resource requirement. The transmission of the adaptation request message advantageously allows for an adaptation to the changed application requirements. A similar advantage is achieved after a change of the network parameter.

According to an implementation of the second aspect, the method comprises transmitting the adaptation request message to the network for requesting the network to adapt to the determined requirement.

According to a further implementation of the second aspect, the method comprises receiving the application requirement from the V2X application, receiving, in response to the transmitted adaptation request message, an acknowledgment message from the network, and transmitting, in response to the received acknowledgment message, a notification message to the V2X application.

According to a further implementation of the second aspect, the method comprises receiving context information of a radio access network, RAN, and/or receiving events for the RAN.

According to a further implementation of the second aspect, the method comprises monitoring the context information and/or events for the RAN, and transmitting a monitoring report to a V2X application of the V2X service based on the monitored context information and/or the monitored events for the RAN.

According to a further implementation of the second aspect, the method comprises receiving vehicle location information from the V2X application. The method further comprises monitoring the vehicle location information. The method further comprises transmitting the monitoring report to the V2X application of the V2X service based on the monitored context information, the monitored events for the RAN, and the monitored vehicle location information.

According to a further implementation of the second aspect, the method comprises receiving context information of a radio access network, RAN, and/or receiving events for the RAN and/or events for a core network entity, and/or receiving application information from a V2X application of the V2X service. The method further comprises configuring extended QoS rules for different states of the V2X service. The method further comprises transmitting the configured extended QoS rules to the core network entity and to the one or more user equipments.

According to a further implementation of the second aspect, the method comprises transmitting the adaptation request message to one of the user equipments for requesting this user equipment to adapt to the requirement.

According to a third aspect, the disclosure relates to a network for supporting a vehicle-to-everything, V2X, service for one or more user equipments. The network is configured to receive, from an entity controlling the V2X service, an adaptation request message comprising a requirement for the V2X service. The requirement comprises at least one of a quality of service, QoS, a mode of operation, and a resource requirement. The network is further configured to adapt to the requirement.

An adaptation can affect a requirement for the V2X service, for a V2X application of the V2X service or for another service/application, in particular a service/application that competes with the V2X service for resources. Additionally or alternatively, an adaptation can affect a parameter of one or more of the aforementioned services or applications.

In particular, the V2X service can be a V2X service for one or more user equipments, wherein the user equipments can be clustered to a group of user equipments.

Thereby, the network can be aware, e.g., of a change in requirement for the V2X service in the form of, e.g., QoS, mode of operation, or resource requirement. The reception of the adaptation request message advantageously allows for an adaptation to the changed requirement. The adaptation can be particularly advantageous for groups of user equipments that are affected by such a change in requirement.

According to an implementation of the third aspect, the network is configured to transmit an acknowledgment message to the entity controlling the V2X service.

Thereby, the acknowledgement message can advantageously be transmitted after the adaptation to the requirement. Accordingly, the entity controlling the V2X service can be aware of the adaptation carried out by the network. Also, the entity controlling the V2X service can then send a corresponding notification of this acknowledgement to one or more V2X applications of the V2X service. Accordingly, said V2X applications can, e.g., be aware of the adaptation for the affected group of user equipments.

According to a further implementation of the third aspect, the network is configured to transmit, to the entity controlling the V2X service, context information of a radio access network, RAN, and/or send, to the entity controlling the V2X service, events for the RAN.

Thereby, the entity controlling the V2X service is aware of the RAN context information and/or the RAN events, said events for the RAN being, in particular, real-time events for the RAN. Accordingly, the entity can monitor said context information and/or events for the RAN. Also, the entity can advantageously inform, e.g., a V2X application of the V2X service in case of a change of said context information and/or events for the RAN.

According to a further implementation of the third aspect, the network is configured to send, to the entity controlling the V2X service, context information of a radio access network, RAN, and/or send, to the entity controlling the V2X service, events for the RAN and/or events for a core network entity. The network is configured to receive, from the entity controlling the V2X service, extended QoS rules for different states of the V2X service. The network is configured to transmit, to the one or more user equipments, the extended QoS rules.

Thereby, the network and the one or more user equipments are preferably involved in running or operating a V2X application of the V2X service. Advantageously, the network can receive specific rules in the form of the extended QoS rules for different states of the V2X service, so as to be able to apply a fast adaptation based on these extended QoS rules. Also, the one or more user equipments can receive these specific rules for different states of the V2X service, so as to be able to apply a fast adaptation based on these extended QoS rules. In particular, the RAN may be the RAN of the network and the core network entity may be an entity of the core network of the network.

According to a fourth aspect, the disclosure relates to a method for supporting a vehicle-to-everything, V2X, service for one or more user equipments. The method comprises receiving, from an entity controlling the V2X service, an adaptation request message comprising a requirement for the V2X service. The requirement comprises at least one of a quality of service, QoS, a mode of operation, and a resource requirement. The method further comprises adapting to the requirement.

Thereby, it is possible to be aware, e.g., of a change in requirement for the V2X service in the form of, e.g., QoS, mode of operation, or resource requirement. The reception of the adaptation request message advantageously allows for an adaptation to the changed requirement. The adaptation can be particularly advantageous for groups of user equipments that are affected by such a change in requirement.

According to an implementation of the fourth aspect, the method comprises transmitting an acknowledgment message to the entity controlling the V2X service.

According to a further implementation of the fourth aspect, the method comprises transmitting, to the entity controlling the V2X service, context information of a radio access network, RAN, and/or sending, to the entity controlling the V2X service, events for the RAN.

According to a further implementation of the fourth aspect, the method comprises sending, to the entity controlling the V2X service, context information of a radio access network, RAN, and/or sending, to the entity controlling the V2X service, events for the RAN and/or events for a core network entity. The method comprises receiving, from the entity controlling the V2X service, extended QoS rules for different states of the V2X service. The method comprises transmitting, to the one or more user equipments, the extended QoS rules.

According to a fifth aspect, the disclosure relates to a user equipment for operating a vehicle-to-everything, V2X, application of a V2X service for one or more user equipments. The user equipment is configured to receive extended QoS rules for different states of the V2X service.

Thereby, the user equipment can advantageously receive specific rules in the form of the extended QoS rules for different states of the V2X service, so as to be able to apply a fast adaptation based on these extended QoS rules. In particular, the one or more user equipments are involved in running or operating a V2X application of the V2X service. The user equipments can be clustered to a group of user equipments. In particular, the one or more user equipments can be connected to a network and can receive the extended QoS rules from the network.

According to a sixth aspect, the disclosure relates to a method for operating a vehicle-to-everything, V2X, application of a V2X service for one or more user equipments. The method comprises receiving extended QoS rules for different states of the V2X service.

Thereby, it is possible to receive specific rules in the form of the extended QoS rules for different states of the V2X service, so as to be able to apply a fast adaptation based on these extended QoS rules.

According to a seventh aspect, the disclosure relates to a vehicle-to-everything, V2X, application of a V2X service for one or more user equipments. The V2X application is configured to transmit, to an entity controlling the V2X service, an application requirement of the V2X application.

Thereby, the one or more user equipments can be connected to a network. The transmission of the application requirement is advantageous, because the entity controlling the V2X service can then determine a requirement for the V2X service based on the application requirement. The requirement for the V2X service may be, e.g., a QoS, mode of operation, or resource requirement.

According to an implementation of the seventh aspect, the V2X application is configured to receive, from the entity controlling the V2X service, a monitoring report related to context information of a radio access network, RAN, and/or related to events for the RAN. The V2X application is configured to transmit, to the entity controlling the V2X service, the application requirement of the V2X application based on the received monitoring report.

Thereby, the V2X application can be informed of a change of said context information and/or events for the RAN. The V2X can advantageously trigger an adaptation to a requirement for the V2X service, said requirement being, e.g., a QoS, mode of operation, or resource requirement.

According to an eighth aspect, the disclosure relates to a vehicle comprising an entity according to the first aspect, and/or a user equipment according to the fifth aspect, and/or a V2X application according to the seventh aspect.

According to a ninth aspect, the disclosure relates to a computer program having a program code for performing the method according to the second, fourth, or sixth aspect, when the computer program runs on a computing device.

For the above issues, it is proposed to introduce an entity or logical control unit, which can be part of the Wireless Communication System (in particular a 5G System) and/or the application domain, to translate the network to V2X or eV2X service requirements (and vice versa) for enabling dynamic SLA adjustment and negotiation, QoS control, configuration of eV2X service operation, group-based SLA monitoring and management.

More specifically, it should be noted that the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the internet.

It shall further be understood that a preferred embodiment of the disclosure can also be any combination of the dependent claims or above embodiments with the respective independent claim.

These and other aspects of the disclosure will be apparent and elucidated with reference to the embodiments described hereinafter.

BRIEF DESCRIPTION OF THE DRAWINGS

The above aspects and implementation forms of the present disclosure will be explained in the following description of specific embodiments in relation to the enclosed drawings, in which.

DETAILED DESCRIPTION

Figure 1A:
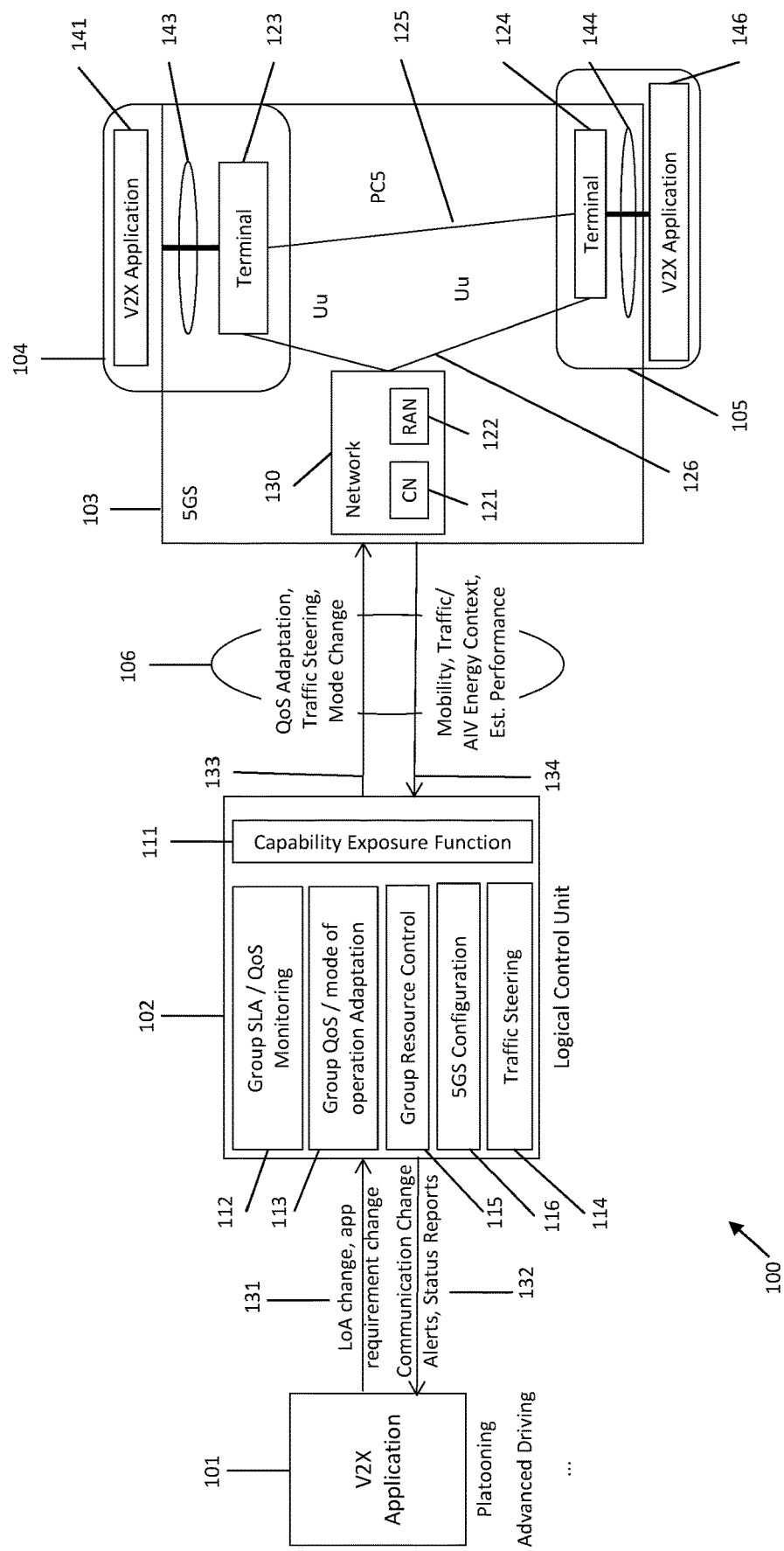
FIG. 1A shows a system according to an embodiment of the present disclosure.

FIG. 1A shows a system 100 according to an embodiment of the present disclosure.

The system comprises an entity 102 for controlling a V2X service for one or more user equipments (UE) 123, 124. The entity 102 can be referred to as Logical Control Unit (LCU) and the user equipments 123, 124 can be referred to as terminals.

The entity 102 is configured to determine a requirement for the V2X service based on a network parameter of a network 130 and/or based on an application requirement of a V2X application 101 of the V2X service. The requirement comprises at least one of a QoS, a mode of operation, and a resource requirement.

The entity 102 is further configured to transmit an adaptation request message comprising the requirement for an adaptation to the requirement.

The entity 102 can be located in an application domain and can communicate via an interface 106 with a 5G system (5GS) or network domain 103. In particular, the entity 102 can communicate with the network 130. The network 130 comprises a core network (CN) 121 and a radio access network (RAN) 122.

The system 100 of FIG. 1A comprises two vehicles 104, 105. The first vehicle 104 comprises a user terminal 123 and a V2X application 141. The user terminal 123 communicates with the V2X application 141 by means of an interface 143. The second vehicle 105 similarly comprises a user terminal 124 and a V2X application 146 that communicate by means of an interface 144. Each user equipment 123, 124 can communicate with the network 130 by means of a Uu interface or link 126. The user equipments 123, 124 can communicate with each other by means of a PC5 interface or link 125.

The V2X applications 101, 141, 146 can be for example directed to Vehicle Platooning, or Advanced Driving. The V2X application 101 can be located at an application server.

The determination of the requirement for the V2X service can be based on the network parameter of the network 130. The network parameter can be transmitted from the network 132 to the entity 102 via the interface 106, as illustrated by reference 134. The network parameter can be related to mobility, traffic context, Air Interface Variants (AIV) energy context, or estimated performance of the network 130. Particularly the mobility can relate to the mobility of the user equipments in the network 130. The network parameter is generally a network condition or limitation.

The determination of the requirement for the V2X service can be based on the application requirement of the V2X application 101. The application requirement can be transmitted from the V2X application 101 to the entity 102, as illustrated by reference 131. The application requirement can be related to a LoA change, or to another application requirement change.

The transmission of the adaptation request message for an adaptation to the requirement is illustrated by reference 133. FIG. 1A shows an adaptation request message related for example to a QoS adaptation, or to a mode change.

Reference 132 illustrates that the entity 102 can transmit to the V2X application 101 for example communication change alerts, or status reports.

The determination of the requirement for the V2X service and the transmission of the adaptation request message are illustrated by reference 113, related to group QoS and/or mode of operation adaptation.

Figure 1B:
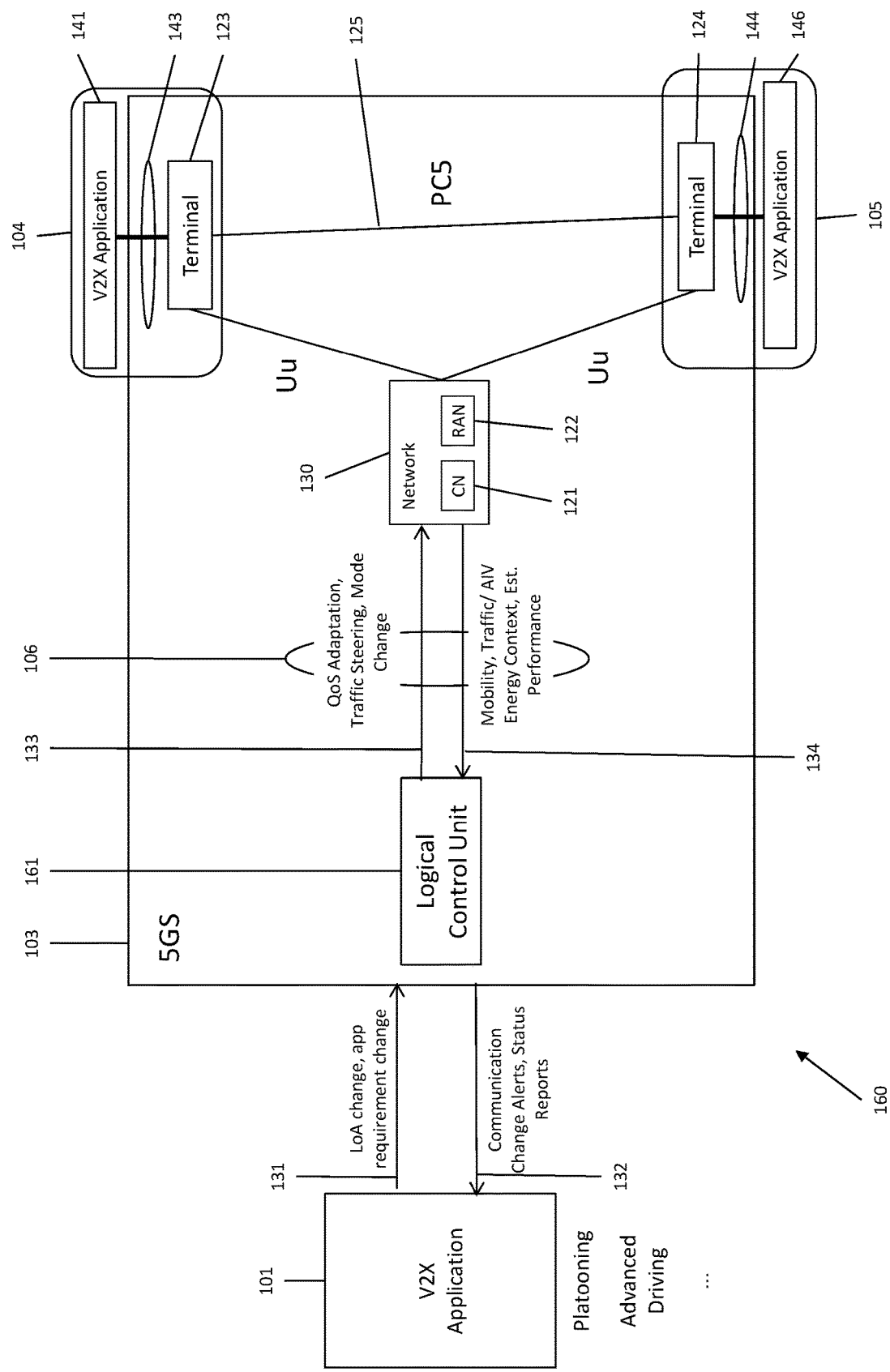
FIG. 1B shows a system according to a further embodiment of the present disclosure.

FIG. 1B shows a system 160 according to a further embodiment of the present disclosure. The system 160 of FIG. 1B comprises an entity 161 that corresponds to the entity 102 of FIG. 1A. The system 160 of FIG. 1B differs from the system 100 of FIG. 1A in that the entity or Logical Control Unit 161 is located in the 5GS or network domain 103.

Figure 1C:
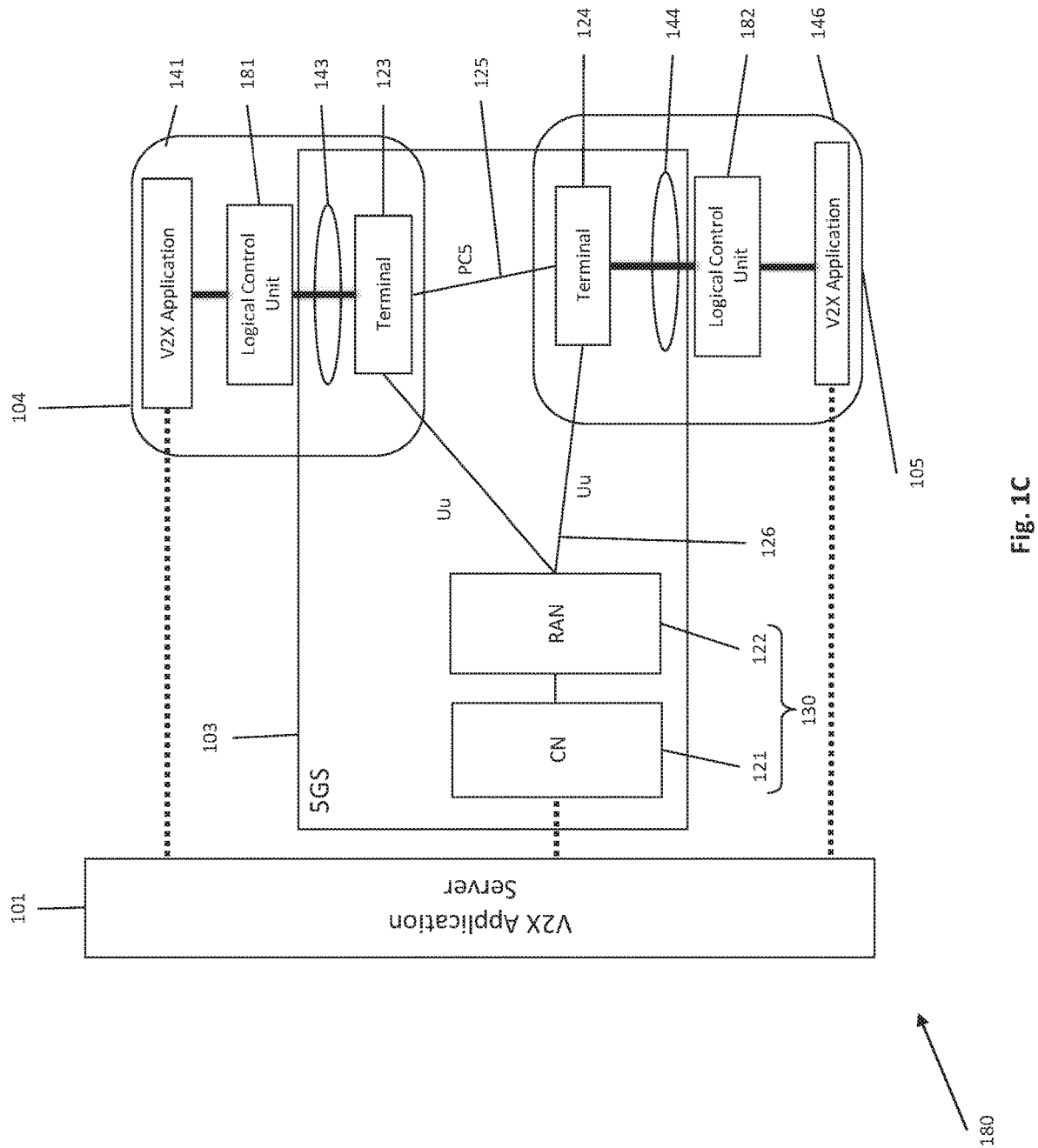
FIG. 1C shows a system according to a further embodiment of the present disclosure.

FIG. 1C shows a system 180 according to a further embodiment of the present disclosure. The difference between the system 180 of FIG. 1C and the systems 100, 160 of FIGS. 1A and 1B is the location of the entity or Logical Control Unit. An entity or Logical Control Unit 181 is located in a vehicle 104. Preferably, an entity or Logical Control Unit 181, 182 is located in each vehicle 104, 105.

While the entity 102, 161 of FIGS. 1A and 1B can communication with the V2X application 101 of e.g. an application server, the entity 181, 182 of the embodiment of FIG. 1C can communicate with the V2X application 141, 146 of the vehicle 104, 105. The entity 181, 182 can also communicate with the user equipment or terminal 123, 124 of its vehicle 104, 105 by means of the interface 143, 144.

As shown in the embodiment of FIGS. 1A, 1B and 1C, the deployment of the entity or Logical Control Unit 102, 161, 181, 182, and the Network Functions to be abstracted at the entity 102, 161, 181, 182 can be:
- at Network-level and/or Base Station (BS)-level, as new middleware application or Network Function (NF) to perform dynamic QoS and/or resource and/or mode management and adaptations jointly or for specified groups of users,
- at user equipment-level or terminal-level, as application module to adapt QoS and/or mode and/or traffic steering locally (e.g. for the case that a UE has dual connectivity to more than one technologies (e.g. 802.11, 4G, 5G RATs)).

Referring to FIGS. 1A, 1B and 1C, the entity 102, 161, 181, 182 allows for a dynamic interaction between the V2X application 101 and the 5G system 103, so as to translate the application requirement to the network parameter and vice versa. This is achieved by monitoring and negotiating a data-plane configurations (QoS, resource requests, mode of operation and/or transmission) for a single or a group of involved V2X-UEs 104, 105.

The entity 102, 161, 181, 182 acts as a middleware entity between the V2X application function 101, 141, 142 and the 5GS 103. The entity 102, 161, 181, 182 allows for QoS and/or SLA management for single or groups of V2X user equipments 123, 124.

The entity 102, 161, 181, 182 can include at least one of the following functional elements:
- a Capability Exposure Function 111 to allow the visibility of the network 130 and/or the V2X service to the V2X Application 101,
- a Group SLA/QoS Monitoring functionality 112 to receive notification/monitoring events and stats so as to trigger group change requests by the V2X application 101,
- the Group QoS and/or Mode of Operation Adaptation functionality 113, which decides based on monitoring and/or application request to change the QoS and/or V2X mode of operation and the related user plane configurations,
- a Traffic Steering functional element 114, which selects based on monitoring or application request the steering of traffic flows via different Air Interfaces and/or RATs (e.g. 4G, 5G AIV, 802.11p),
- a Group Resource Control functionality 115, which performs control for V2X-UE bundling of resources and/or resource pools to optimize the performance of V2X services by fast and efficient resource provisioning,
- a 5GS Configuration 116.

FIGS. 2 to 6 show embodiments of the present disclosure with the entity or Logical Control Unit residing at the Network Side and/or at the application domain, in particular between 5GS and the application server, as shown in FIGS. 1A and 1B.

Figure 2:
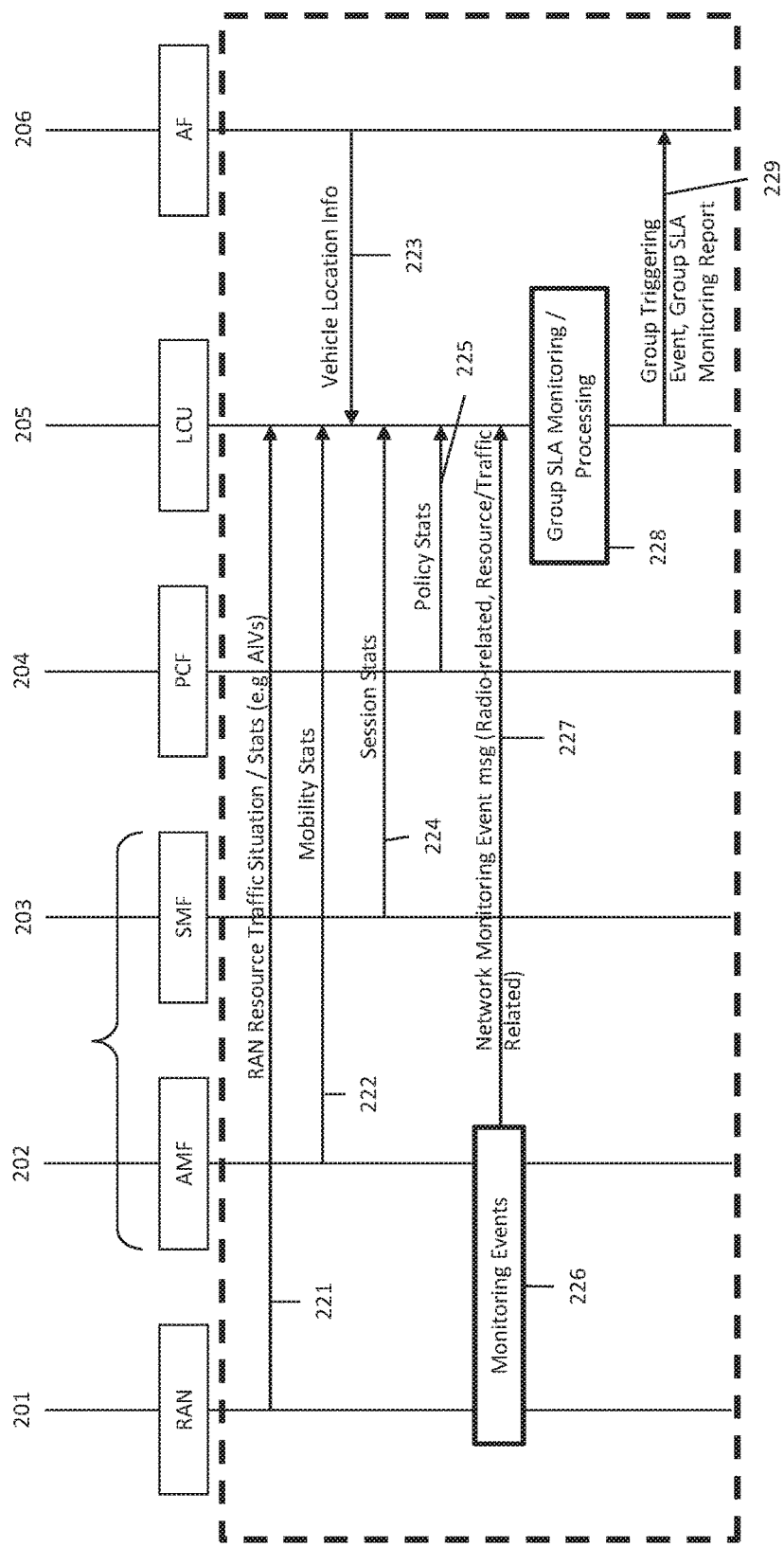
FIG. 2 shows a monitoring according to an embodiment of the present disclosure.

FIG. 2 shows a monitoring 200 according to an embodiment of the present disclosure. The monitoring 200 is an example of the Group SLA/QoS Monitoring functionality 112.

In this embodiment, the network 130 comprises the RAN 201 and a Core Network. The Core Network comprises an Access and Mobility Management Function (AMF) 202, a Session Management Function (SMF) 203, and a Policy Control Function (PCF) 204. The AMF 202, SMF 203, and PCF 204 preferably are part of the Core Network Control Plane (CN-C).

The reference 205 corresponds to the entity or Logical Control Unit 100, 160, 180. The reference 206 corresponds to the V2X application 101, 141, 142. The V2X application 206 can also be referred to as Application Function (AF).

The 5GS of this embodiment preferably addresses a set of cars, i.e. a set of vehicles 104, 105, because there are dependencies between cars for traffic efficiency. An SLA agreement for a given vehicle must consider SLA agreements assigned to surrounding vehicles to avoid problems. The monitoring 200 comprises Stats Processing and Group SLA Monitoring.

The entity 205 can receive 221 context information of the RAN 201 and/or receive 227 events for the RAN 201. The context information and events can be referred to as RAN Resource and/or Traffic Situation and/or Stats and/or Context. The context information and events can include information on at least one of the following elements:
- Traffic and Radio Resource Situation,
- Availability,
- RAN Status,
- RAN Failure,
- RAN Overload,
- RAN Coverage,
- RAN Load, and
- UE Density.

The rationale for this is the fact that the context info would impact the V2X application 206. In case the 5GS uses multiple Air Interface Variants (AIV), e.g. below and above 6 GHZ AIVs, this will strongly affect the eV2X service operation (e.g. using Uu or PC5) and/or traffic steering to different AIV.

The received context information of the RAN 201 is preferably received 221 periodically by the entity 205. Examples of context information of the RAN include:
- Traffic Situation: e.g. the traffic load per cell, the number of active connections per cell, the traffic load per AIV, the number of connections per AIV, or the Queue Status Information at BS,
- AIV and/or Resource Availability: e.g. the Radio Link Conditions like the Average channel conditions per AIV, the average channel conditions at cell-edge, the cell center areas, the AIV capabilities, or the AIV availability.

The received events for the RAN 201 is based on monitoring events 226. The monitoring events feature is intended for monitoring of specific events. The Network Function that detects the events can be the AMF 202.

The events for the RAN 201 are preferably real-time monitoring events. The events for the RAN 201 can comprise one or more of the following indications:
- RAN Failure indication,
- RAN Overload indication,
- Coverage Change indication, and
- UE Density Change indication.

Furthermore, the events for the RAN 201 can comprise:
- Loss of Connectivity: the network detects that the UE is no longer reachable for either signaling or user plane communication.
- UE reachability: this event indicates when the UE becomes reachable for sending either SMS or downlink data to the UE, which is detected when the UE transitions to CONNECTED mode or when the UE will become reachable for paging, e.g., Periodic Registration Update timer.
- Location Reporting: this event indicates either the Current Location or the Last Known Location of a UE. One-time and Continuous Location Reporting are supported for the Current Location. For Continuous Location Reporting the serving node(s) sends a notification every time it becomes aware of a location change, with the granularity depending on the accepted accuracy of location. For One-time Reporting is supported only for the Last Known Location.
- Roaming status: this event indicates UE's current roaming status and notification when that status changes.
- Number of UEs present in a geographical area: this event indicates the number of UEs that are in the geographic area described by the AF. The AF may ask for the UEs that the system knows by its normal operation to be within the area (Last Known Location) or the AF may request the system to also actively look for the UEs within the area (Current Location).

The entity 205 can receive 223 vehicle location information from the V2X application 206. The vehicle location information can for example be the vehicle coordinates. The vehicle location information can be vehicle mobility and/or location information (e.g. using maps and navigation information and/or prediction).

This is advantageous, because the known Location Reporting from AMF 202 is at a cell level or at a Tracking Area level. The V2X application 206 has more accurate location information as well as mobility prediction through navigation map information and this can be useful to allow 5GS to perform Group-based Monitoring and APP-to-QoS mapping.

The entity 205 can also receive 222, 224, 225 stats for Mobility, Session and Policies from respectively the AMF 202, the SMF 203, and the PCF 204 according to section 4.15.1 of the standard TS 23.502.

The entity 205 can monitor 228 the context information and/or events for the RAN 201, and transmit 229 a monitoring report to the V2X application 206 based on the monitored context information and/or the monitored events for the RAN 201.

The entity 205 can monitor 228 the vehicle location information, and transmit 229 the monitoring report to the V2X application 206 based on the monitored context information, the monitored events for the RAN 201, and the monitored vehicle location information.

Based on the context information received in step 221, the entity 205 can process all the network context information and may provide to the V2X application 206 a group-SLA monitoring report/trigger 229 to allow the V2X application to update the service requirements (e.g. QoS or mode of operation) only for the group of vehicles which are affected.

Based on the monitoring events 226, a new Network Monitoring Event message can be initiated by the RAN or AMF to the entity 205. The entity 205 then performs, through a Group SLA monitoring 228, the translation to a Group Triggering Event or Group Monitoring Report 229 and sends this to the V2X application 206. This message may initiate an updated request from the V2X application 206 regarding the V2X data plane configuration (QoS, mode of operation, resource etc.).

Figure 3:
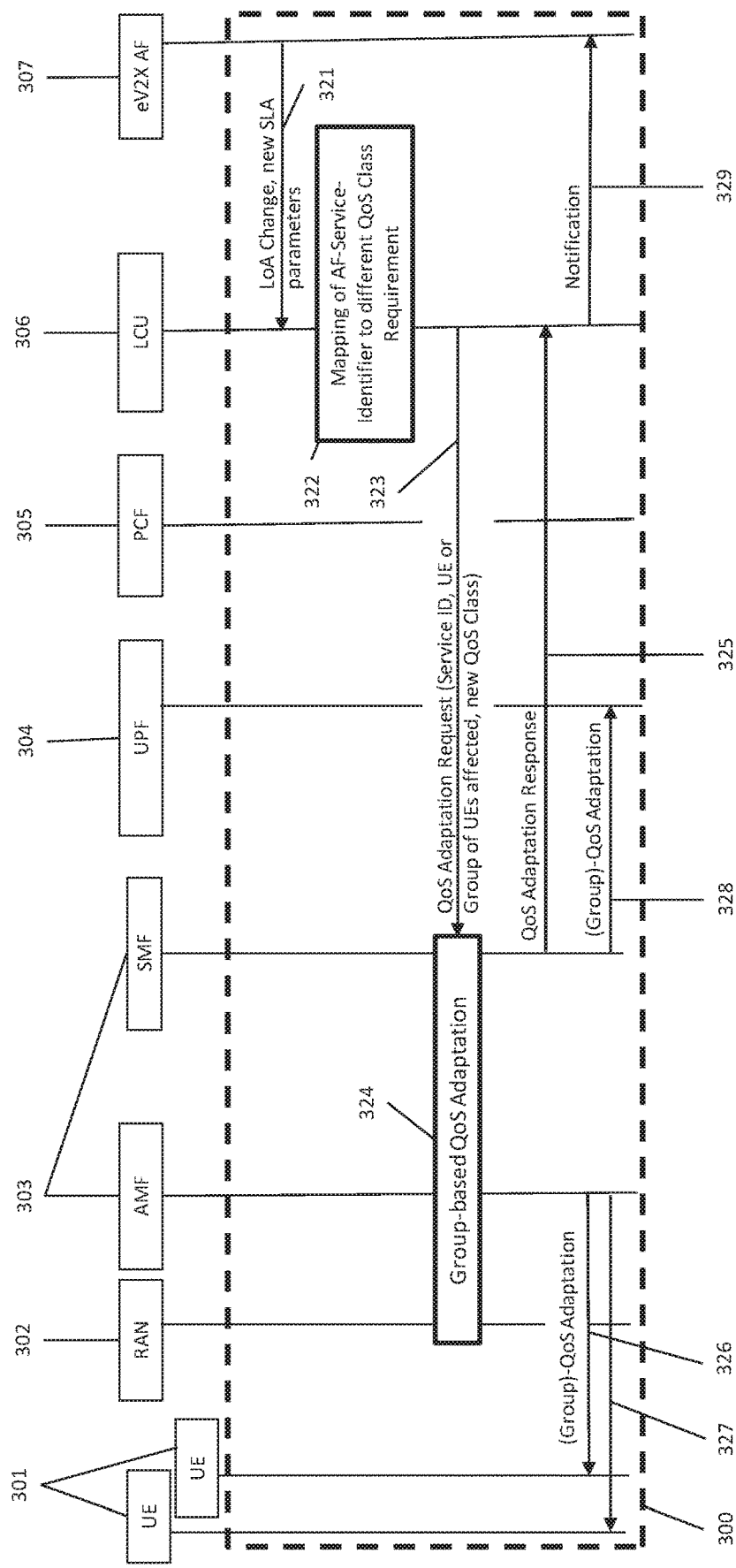
FIG. 3 shows an adaptation according to an embodiment of the present disclosure.

FIG. 3 shows an adaptation 300 according to an embodiment of the present disclosure. The adaptation 300 is an example of the Group QoS and/or Mode of Operation Adaptation functionality 113.

In this embodiment, the network 130 comprises the RAN 302 and the Core Network. The Core Network comprises the AMF and the SMF 303, the PCF 305 and a User Plane Function (UPF) 304. The AMF and SMF 303, and the PCF 305 preferably are part of the Core Network Control Plane (CN-C).

The reference 205 corresponds to the entity or Logical Control Unit 100, 160, 180. The reference 206 corresponds to the V2X application 101, 141, 142. The V2X application 206 can also be referred to as Application Function (AF).

The adaptation 300 shows how the V2X application 307 can influence network-related configuration procedures like QoS control, Mode of Operation and/or resource requests via the entity 306.

The adaptation 300 particularly shows the V2X application 307 influencing QoS Adaptation via the entity 306. Accordingly, a new process is introduced at the network in order to allow the V2X application 307 to alternate the QoS for a service (e.g. due to LoA change). The V2X application 307 can be identified by an identifier referred to as AF-Service-Identifier. The mapping of AF-Service-Identifier to Network (NW) related information, can be modified to support the mapping of AF-Service-LoA-Identifier to QoS parameters (e.g. bearer info, configuration). The QoS and/or mode change request will affect the user or groups of users of the same service.

FIG. 3 shows the adaptation 300, and, in particular, the steps for QoS adaptation triggering by the entity 306. Initially, a triggering event is received 321 by the entity 306 from the V2X application 307. For example, the triggering event denotes a new LoA request or QoS requirements for a given service. The entity 306 then maps 322 the AF-Service-Identifier to different QoS mapping for single or pre-defined set of vehicles within this service group.

Then, a QoS adaptation Request message is sent 323 by the entity 306 to the network. The QoS adaptation Request message can be sent to the CN-C(SMF and/or AMF 303). The QoS adaptation Request message can be sent to the RAN 302, for example, in case the RAN supports dynamic QoS Control and/or Enforcement.

In a step of Group-based QoS adaptation 324, the QoS adaptation Request message can be applied as an immediate (re-)action or as a new policy rule that would affect residing vehicles.

The QoS adaptation Request message has one or more of the following parameters:
Service ID and optionally LoA Identifier,
UE ID or Group-UE IDs,
New QoS class (or PPPP) per UE and/or Group of UEs, wherein the QoS class can be a QoS Class Identifier (QCI) or a ProSe Per Packet Priority (PPPP).

Then, the entity 306 receives 325 a QoS Adaptation Response (ACK/NACK) from the CN-C 303 and/or the RAN 302. Finally, the Group-QoS adaptation is executed by sending new messages 326, 327 to the UEs and by sending 328 a QoS adaptation message to the UPF 304 for the adaptation of the user-plane. Also, the V2X application 307 receives 329 a Notification message about the change of QoS related to a particular vehicle or group of affected vehicles.

Figure 4:
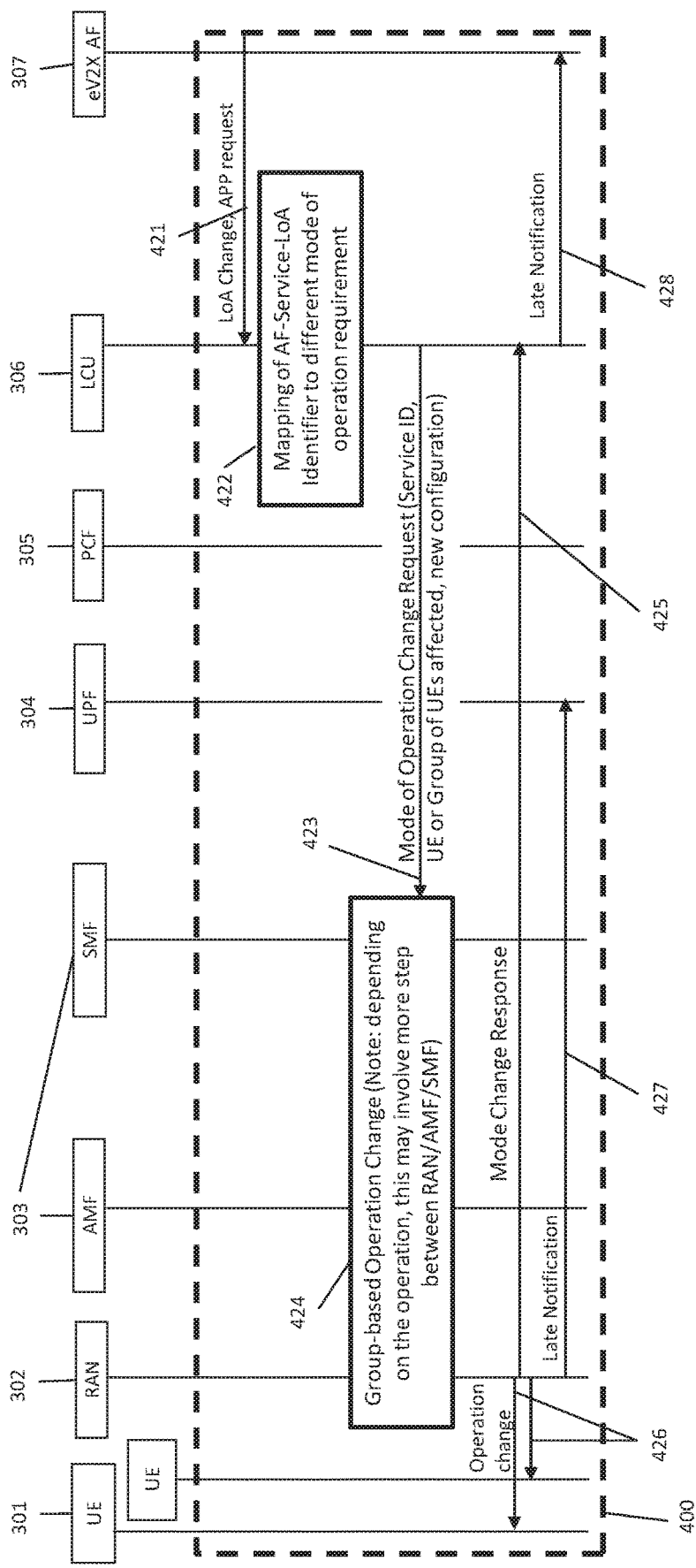
FIG. 4 shows an adaptation according to a further embodiment of the present disclosure.

FIG. 4 shows an adaptation 400 according to a further embodiment of the present disclosure. The adaptation 400 is an example of the Group QoS and/or Mode of Operation Adaptation functionality 113.

The adaptation 400 shows the V2X application 307 influencing Mode of Operation Adaptation via the entity 306. Accordingly, a new process is introduced at the network in order to allow the V2X application 307 to alternate the mode of operation (e.g. between unicast/multicast, data plane using Uu vs PC5 etc.). For Mode change request, CN-C and/or RAN should handle the group-based mode of operation change.

FIG. 4 shows the adaptation 400, and, in particular, the steps for Mode of operation adaptation. Initially, a triggering event is received, at 421, by the entity 306 from the V2X application 307 (e.g. denoting a new LoA request or operation requirements for a given service). The entity 306 then maps, at 422, the AF-Service-Identifier to different V2X mode of operation requirements for a single or a pre-defined set of users within this service group.

An example is the case when the operation needs to change from Vehicle-to-Network-to-Vehicle to Vehicle-to-Vehicle e.g. due to poor 5G coverage in certain area. In this case, the interface needs to change from Uu to PC5 and this will change the entire architecture and procedures.

Then, a Mode of adaptation Request message is sent, at 423, by the entity 306 to the involved domains that are affected, in particular, the CN-C(SMF/AMF 303), as well as the RAN 302.

The Mode of adaptation Request message has one or more of the following parameters:
Service ID and optionally LoA Identifier,
UE ID or Group-UE IDs,
New UP Configuration which includes the protocols, functions and their parameterization which is required for the mode of Operation (e.g. PC5 vs UU) per UE and/or Group of UEs.

After the reception of the Mode of adaptation Request message, a Group-based operation change is carried out by the network, e.g. by the RAN 302 and/or the CN-C 303.

Then, the entity 306 receives, at 425, a Mode of Operation Adaptation Response (ACK/NACK) from the CN-C and/or the RAN. Finally, the Group-Operation adaptation is executed by sending, at 426, new messages to the UEs and, optionally, by sending, at 427, a (Group)-Operation Adaptation or Notification to the UPF 304 for the adaptation of the user-plane. Also, the V2X application 307 receives, at 428, a Notification message from the entity 306 about the change of operation for the user of group of users affected.

Figure 5:
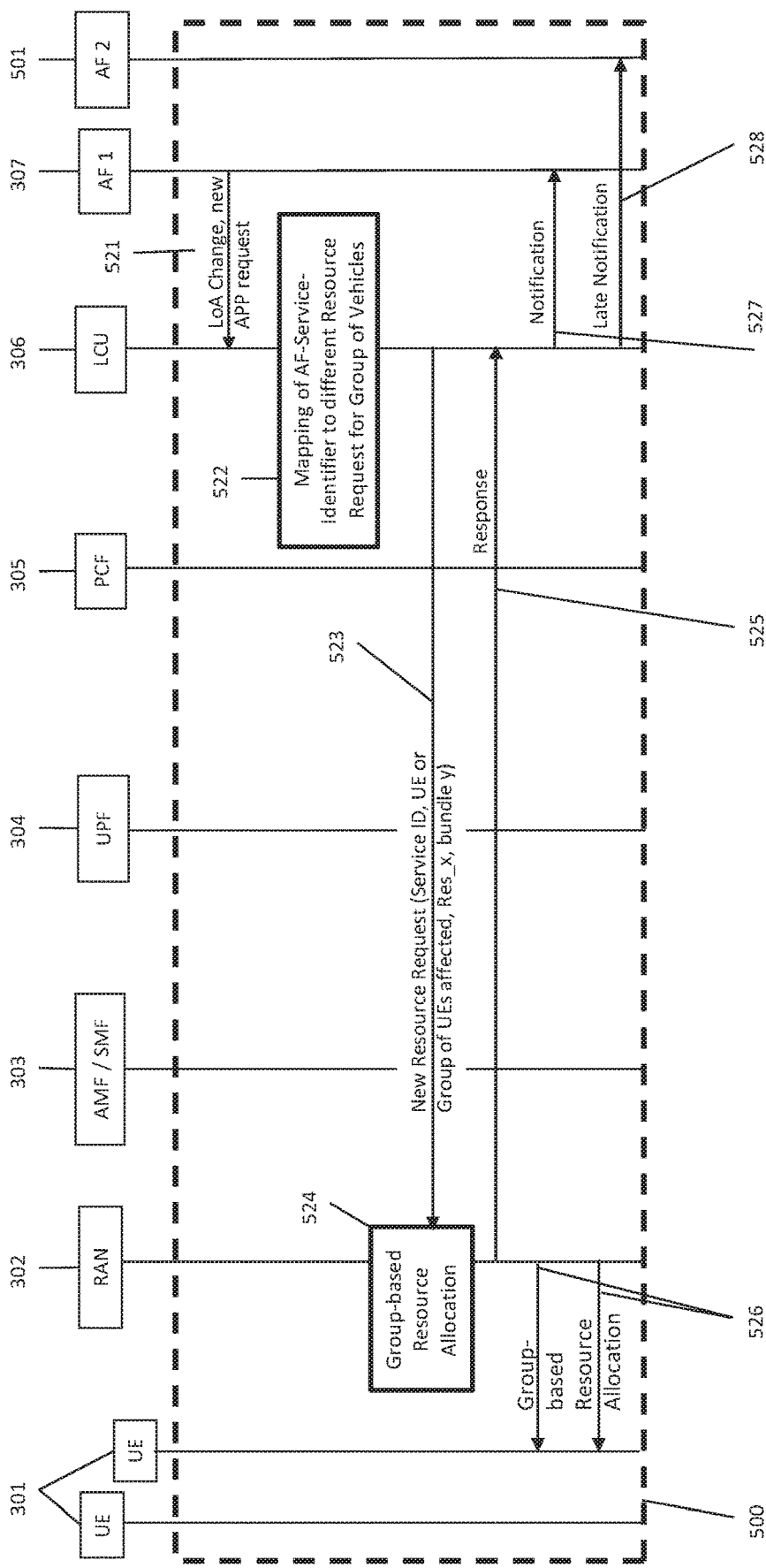
FIG. 5 shows an adaptation according to a further embodiment of the present disclosure.

FIG. 5 shows an adaptation 500 according to a further embodiment of the present disclosure. The adaptation 500 is an example of the Group QoS and/or Mode of Operation Adaptation functionality 113.

The adaptation 500 shows the V2X application 307 influencing Group Resource Request Change via the entity 306. Accordingly, a new process is introduced at the network in order to allow the V2X application 307 to bundle or change the resource requests for a group of users.

FIG. 5 shows the adaptation 500, and, in particular, the steps for Group-resource allocation and adaptation. Initially, a triggering event is received, at 521, by the entity 306 from the V2X application 307 (e.g., denoting a new LoA request or operation requirements for a given service).

The entity 306 then maps, at 522, the AF-Service-Identifier to a group-UE resource request jointly or for a pre-defined set of vehicles (e.g. within a service group). This may involve the bundling of resources and the grouping of users with different resource requests in advance so as to ensure meeting the requirements. This requires also monitoring and/or stats from RAN to have the updated information of the radio resource availability and average quality. The reason of this is that some V2X application 307 may have different resource demands and V2X is a family of service with extreme differences in resource requirements (application data can range from 20 B to 12000 B). So, the bundling of resources or resource pools to groups of users belonging at the same or different services may be required to avoid resource starvation.

Then, a New Resource Request message is sent, at 523, by the entity 306 to the RAN 302, which is affected and decides, at 524, on the group-based resource allocation.

The New Resource Request message has one or more of the following parameters:
Service ID and optionally LoA Identifier,
UE ID or Group-UE IDs,
Resource ID and/or Resource Pool ID,
Bundle ID which identifies that the user belongs to a specific group which will be associated with a resource pool.

Then, the entity 306 receives, at 525, a response (ACK/NACK) from the RAN 302. Finally, the Group-based resource allocation is performed, at 526, in real-time based on the actual user demands. The V2X application 307, which has sent, at 521, the triggering event, receives, at 527, a Notification message from the entity 306 about the change of resource request. Optionally, other V2X applications 501, which are affected by the change of resource, receive, at 528, a Late Notification message 528 about the change.

Figure 6:
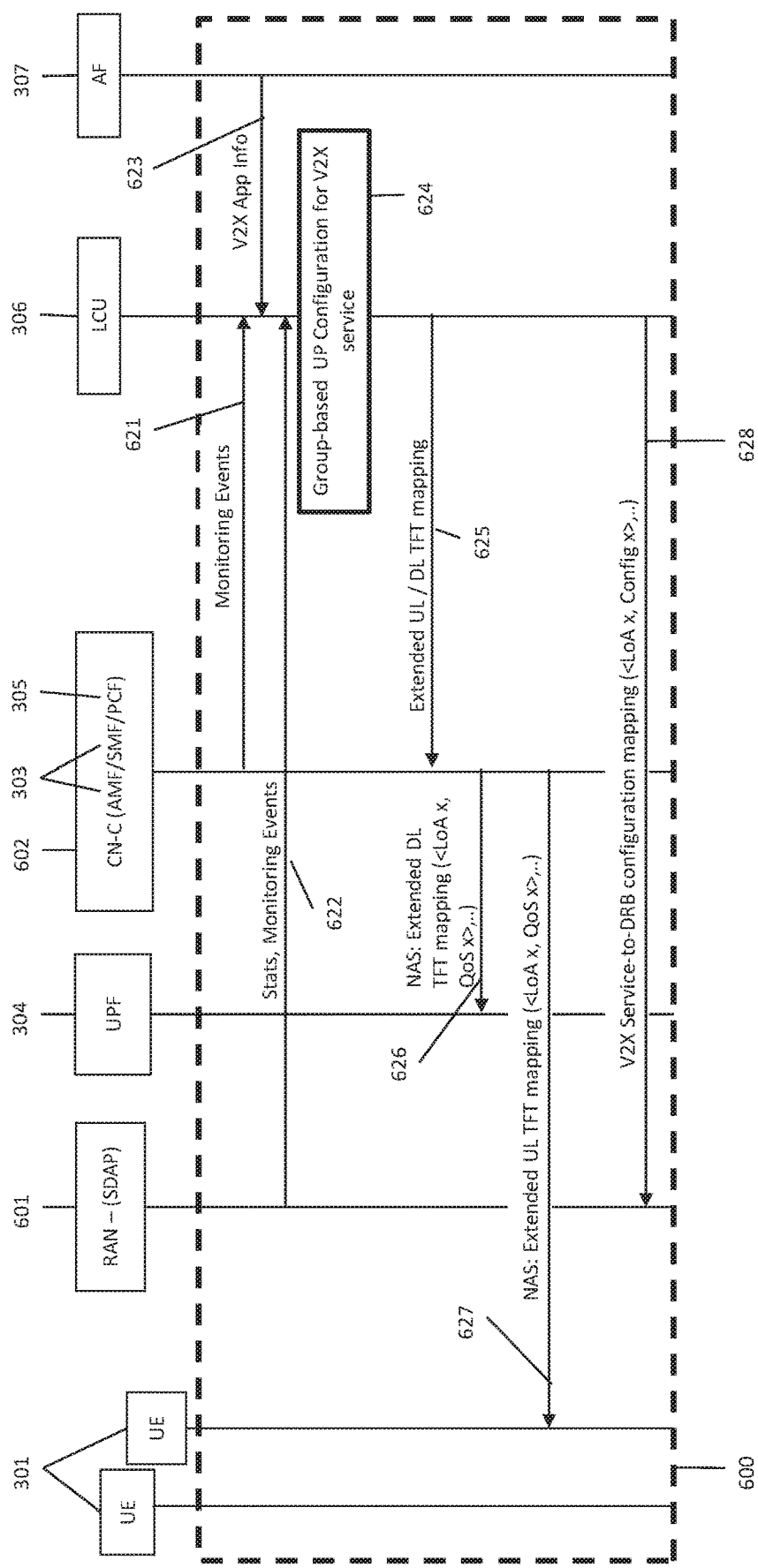
FIG. 6 shows a configuration according to an embodiment of the present disclosure.

FIG. 6 shows a configuration 600 according to an embodiment of the present disclosure. Another task of the entity 306 is to pre-configure the 5GS domain about the new mapping rules and policies for different LoA/CoR so as to allow the fast decision from 5GS using pre-defined tables. This is important for delay-critical services which require fast adaptation of QoS/mode of operation for groups of vehicles.

Accordingly, the entity 306 receives, at 622, context information of the RAN 601, and/or receives, at 621, 622, events for the RAN 601 and/or events for the core network 602, and/or receives, at 623, application information from the V2X application 307. The entity 306 then configures, at 624, extended QoS rules for different states of the V2X service. The entity 306 then transmits, at 625, 627, the configured extended QoS rules to the core network 602 and to the user equipments 301.

The reference 601 particularly refers to the RAN and the Service Data Adaptation Protocol (SDAP), and reference 602 is the CN-C that can comprise the AMF and SMF 303, as well as the PCF 305.

FIG. 6 shows the configuration 600, and, in particular, the steps for V2X-centric 5GS Configuration by the entity 306.

After periodically receiving stats on the RAN and CN situation, as well as information of the registered users and active applications, including, optionally, location information from the V2X application, the entity 306 can perform, at 624, an APP-tailored group-based pre-configuration of 5GS to support this service and potential adaptations.

Regarding the CN-C, pre-defined policy rules can be configured by the entity 306 and can be stored at the CN-C (e.g. SMF) to enable the mapping of new V2X LoA to new QoS requirements. An Extended UL/DL TFT mapping table, which includes entries for different LoA with the following parameters <Service x, LoA y, QoS UL z, QoS DL w, QoS SL q>, is transmitted by the entity 306 to the UEs 301. This transmission, at 625, is carried out using existing NAS interfaces. The mapping table is transmitted for extending the UL TFT with new entries for different LoA. Accordingly, an extended UL TFT mapping table is sent, at 627, from the CN-C 602 to the UEs 301, and an extended DL TFT table is sent from the CN-C 602 to the UPF 304.

The UL/DL Traffic Flow Template (TFT) can be used as follows:
In LTE, as part of the Dedicated EPS bearer establishment, a DL-TFT and UL-TFT can be assigned.
The EPS Bearer TFT is the collection of all packet filters associated with that EPS bearer and is used as part of the classification of a packet in order to ensure the correct traffic is sent on the correct bearer.
DL TFT usually resides at the CN-C (e.g. AMF or SMF or PCF). The UL-TFT usually resides at the UE, and can be sent by the CN-C over NAS signaling.

The RAN 601 can be configured by the entity 306. Specifically, the Service Data Adaptation Protocol (SDAP) can be configured by the entity 306. The SDAP is introduced in 5G as a protocol for QoS flow to Data Radio Bearer (DRB) mapping and control. The QoS flow to DRB mapping procedure is e.g. described in section 5.3 of the standard 3GPP TS 37.324 specification v1.1.1. The entity sends, at 628, to the RAN/SDAP 601 a V2X Service-to-DRB configuration mapping message that comprises the Service ID and LoA ID, as well as a DRB and/or DRB Configuration identifier for each LoA that is supported by this service. This mapping will be executed/applied based on these rules by the RAN for all the user or group of users which are within this service and LoA.

Figure 7:
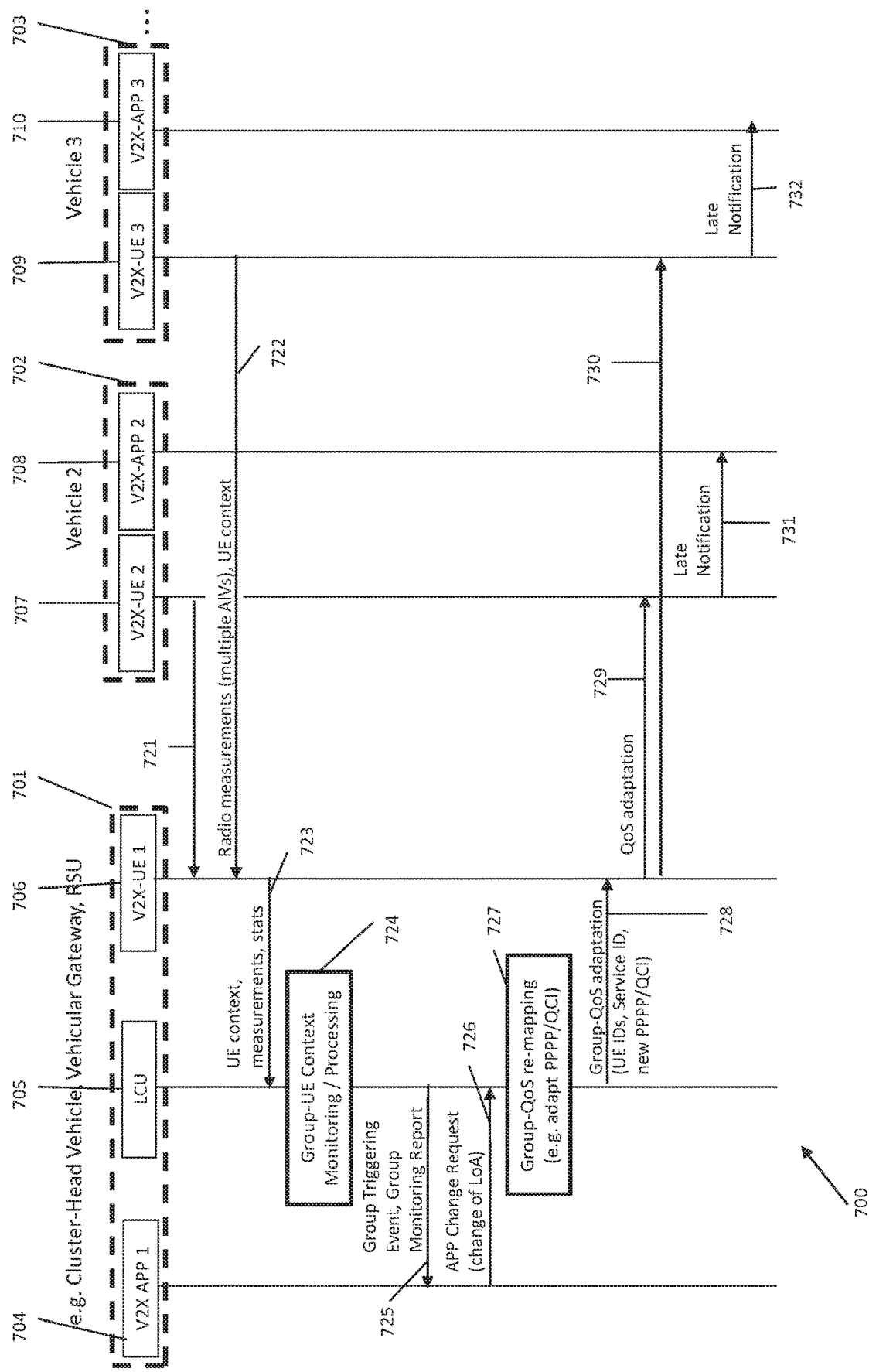
FIG. 7 shows a further embodiment of the present disclosure.

FIG. 7 shows a further embodiment of the present disclosure. According to this embodiment, the entity or Logical Control Unit 705 can be implemented at the vehicle 701 between the UE 706 and the V2X application 704, as shown in FIG. 1C. Such an entity can be referred to a terminal-deployed entity 705.

The entity 705 can be located at the vehicle 701, for example, in cases where the V2X application 704 is running locally, e.g. using PC5 or RAN for the data and control plane. Also, the entity 705 can be located at the vehicle 701 in cases where the vehicle or terminal side needs to adapt the configuration of the UE, e.g., due to poor coverage scenarios like in tunnels.

The main task is the monitoring, at 724, of radio-related measurements, which can trigger an application change request or QoS/mode of operation/resource changes for a group of vehicles locally.

FIG. 7 shows the steps for terminal-deployed entity in an out-of-coverage scenario. In particular, FIG. 7 shows an embodiment, in which a platoon 701 needs to locally adapt, at 727, the QoS based on monitoring, at 724, without the use of the Uu interface.

A cluster-head vehicle 701 or a Remote Side Unit (RSU, e.g., a stationary vehicle) receives, at 721, 722, radio measurements on the supported Air Interfaces and UE context information over sidelink by the other vehicles 702, 703 in the group of UEs. In particular, the UE 706 of the cluster-head vehicle 701 receives, at 721, 722, radio measurements and context information from the UEs of the other vehicles 702, 703.

The UE 706 of the cluster-head vehicle 701 transmits the received radio measurements and context information, as well as long-term stats, to the entity 705. Based on the radio measurements, the context information, and the long-term stats, the entity 705 performs, at 724, Group-UE Context Monitoring and Processing.

Then, a Group Triggering Event and/or a Monitoring Report, at 725, is sent by the entity 705 to the V2X application 704 of the cluster-head vehicle 701. If the V2X application 704 needs to change the LoA or the requirements, the V2X application 704 then sends, at 726, to the entity 705 an Application Change Request message.

This Application Change Request message is translated, at 727, by the entity 705 to a Group-QoS Adaptation message that is sent, at 728, 729, 730, to the UEs 707, 709 of the other vehicles 702, 703. The Group-QoS Adaptation message is sent, at 728, 729, 730, to the UEs 707, 709 of the other vehicles 702, 703 via the UE 706 of the cluster-head vehicle 701.

This Group-QoS Adaptation includes information on the requested change which can be a new QoS Class Identifier (QCI) or a different ProSe Per Packet Priority (PPPP) level in case of sidelink.

Finally, the UEs 707, 709 of the other vehicles 702, 703 apply the requested QoS changes and notify, at 731, 732, the respective V2X application 708, 710 of the other vehicles 702, 703 using a Late Notification message.

The disclosure introduces the following advantages:
The processing—at the entity or Logical Control Unit—of stats and monitoring events related to different domains of the 5GS (RAN, CN, UE) can provide more comprehensive input at the V2X application function.
The translation of user/network context information and radio related measurements to reports/alerts/triggers can be useful for the application to decide fast on adapting and negotiating the requirements of the service.
Decision making at the entity and configuration of 5GS components are advantageous for enhancing flexibility and minimize Control Plane delays.

The disclosure proposes an entity or logical control unit, which can reside at the Network/BS and/or at the V2X-terminal side.

This entity can be responsible for the monitoring and translation of the network conditions and/or requirements to V2X service requirements. This monitoring and translation can comprise receiving network context and/or monitoring events, process and forward to the application function(s) to trigger the application QoS requirement change. This monitoring and translation can comprise providing Group-based SLA monitoring and QoS control for eV2X applications (e.g. platooning).

This entity can be responsible for the Translation and Negotiation of the V2X service new/updated requirements to Network Requirements (QoS change, different mode of operation, group management). This Translation and Negotiation can comprise, upon triggering an update of the application, enabling a translation to the appropriate QoS requirements or mode (state) of operation for groups of users being affected by this change.

This entity can be responsible for the Configuration of the controlled elements of the 5G System (e.g. Terminal, RAN, CN), which are involved in running/operating the V2X application with a set of eV2X specific rules/policies (related to LoA & CoR combinations) in order to apply fast QoS/mode adaptation based on dynamic change of locally observed network requirements, e.g. radio conditions at the BS.

To carry out these tasks, the proposed entity can comprise at least one of the following functionalities:
a Network/Service Capability Exposure Function 111,
a Group SLA/QoS Monitoring functionality 112,
a Group QoS and/or Mode of Operation Adaptation functionality 113,
a Traffic Steering functional element 114, and
a Group Resource Control functionality 115.

While illustrative examples and implementations of the invention have been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An entity for controlling a vehicle-to-everything (V2X) service for multiple user equipment, wherein the multiple user equipment are clustered into a group of user equipment, and wherein the V2X service for the multiple user equipment is a V2X service for the group of user equipment, the entity including:
  a processor; and
  a non-transitory computer-readable medium including computer-executable instructions that, when executed by the processor, cause the entity to carry out a method comprising:
    determining a requirement for the V2X service for each user equipment of the group of user equipment based on:
      a network parameter of a network, and/or
      an application requirement of a V2X application of the V2X service,
      wherein the requirement for the V2X service comprises a resource requirement or a quality of service (QoS); and
    transmitting an adaptation request message to the network comprising the requirement for the V2X service for each user equipment of the group of user equipment for obtaining an adaptation according to the requirement for the V2X service for each user equipment of the group of user equipment.

2. The entity according to claim 1, wherein the transmitting the adaptation request message comprises transmitting the adaptation request message to the network for requesting the network to adapt to the requirement for the V2X service for each user equipment of the group of user equipment.

3. The entity according to claim 1, wherein the method carried out by the entity further comprises:
  receiving the application requirement from the V2X application;
  receiving, in response to the transmitting the adaptation request message, an acknowledgment message from the network; and
  transmitting, in response to the receiving the acknowledgment message, a notification message to the V2X application.

4. The entity according to claim 1, wherein the method carried out by the entity further comprises:
  receiving a context information of a radio access network (RAN), and/or events for the RAN.

5. The entity according to claim 4, wherein the method carried out by the entity further comprises:
  monitoring the context information and/or events for the RAN; and
  transmitting a monitoring report to the V2X application of the V2X service based on the monitored context information and/or the monitored events for the RAN.

6. The entity according to claim 5, wherein the method carried out by the entity further comprises:
  receiving a vehicle location information from the V2X application;
  monitoring the vehicle location information; and
  transmitting the monitoring report to the V2X application the V2X service based on the monitored context information, the monitored events for the RAN, and the monitored vehicle location information.

7. The entity according to claim 1, wherein the method carried out by the entity further comprises:
  receiving a context information of a radio access network (RAN), and/or events for the RAN, and/or events for a core network entity, and/or application information from the V2X application of the V2X service;
  configuring extended QoS rules for different states of the V2X service; and
  transmitting the configured extended QoS rules to the core network entity and the multiple user equipment of the group of user equipment.

8. The entity according to claim 1, wherein the entity is located in:
  a network,
  an application domain, or
  a vehicle that comprises a user equipment of the group of user equipment.

9. The entity according to claim 1, wherein the method carried out by the entity further comprises:
  transmitting the adaptation request message to a user equipment of the group of user equipment for requesting the user equipment to adapt to the requirement for the V2X service.

10. A method for controlling a vehicle-to-everything (V2X) service for multiple user equipment, wherein the multiple user equipment are clustered into a group of user equipment, and wherein the V2X service for the multiple user equipment is a V2X service for the group of user equipment, the method comprising:
  determining a requirement for the V2X service for each user equipment of the group of user equipment based on:
    a network parameter of a network, and/or
    an application requirement of a V2X application of the V2X service,
    wherein the requirement for the V2X service comprises a resource requirement or a quality of service (QoS); and
  transmitting, to the network, an adaptation request message comprising the requirement for the V2X service for each user equipment of the group of user equipment for obtaining an adaptation according to the requirement for the V2X service for each user equipment of the group of user equipment.

11. The method according to claim 10, wherein the transmitting the adaptation request message comprises transmitting the adaptation request message to the network for requesting the network to adapt to the requirement for the V2X service for the group of user equipment.

12. The method according to claim 10, wherein the method carried out by the entity further comprises:
  receiving the application requirement from the V2X application;
  receiving, in response to the transmitting the adaptation request message, an acknowledgment message from the network; and
  transmitting, in response to the receiving the acknowledgment message, a notification message to the V2X application.

13. The method according to claim 10, wherein the method carried out by the entity further comprises:
  receiving a context information of a radio access network (RAN), and/or events for the RAN.

14. The method according to claim 13, wherein the method carried out by the entity further comprises:
  monitoring the context information and/or events for the RAN; and
  transmitting a monitoring report to the V2X application of the V2X service based on the monitored context information and/or the monitored events for the RAN.

15. The method according to claim 14, wherein the method carried out by the entity further comprises:
- receiving a vehicle location information from the V2X application;
- monitoring the vehicle location information; and
- transmitting the monitoring report to the V2X application the V2X service based on the monitored context information, the monitored events for the RAN, and the monitored vehicle location information.

16. The method according to claim 10, wherein the method carried out by the entity further comprises:
- receiving a context information of a radio access network (RAN), and/or events for the RAN, and/or events for a core network entity, and/or application information from the V2X application of the V2X service;
- configuring extended QoS rules for different states of the V2X service; and
- transmitting the configured extended QoS rules to the core network entity and the multiple user equipment of the group of user equipment.

17. The method according to claim 10, wherein the entity is located in:
- a network,
- an application domain, or
- a vehicle that comprises a user equipment of the group of user equipment.

18. The method according to claim 10, wherein the method carried out by the entity further comprises:
- transmitting the adaptation request message to a user equipment of the group of user equipment for requesting the user equipment to adapt to the requirement for the V2X service for each user equipment of the group of user equipment.

19. A network for supporting a vehicle-to-everything (V2X) service for multiple user equipment, wherein the multiple user equipment are clustered into a group of user equipment, and wherein the V2X service for the multiple user equipment is a V2X service for the group of user equipment, the network being configured to carry out a method comprising:
- receiving, from an entity controlling the V2X service, an adaptation request message comprising a requirement for the V2X service for each user equipment of the group of user equipment, wherein the requirement comprises a resource requirement or a quality of service (QoS); and
- adapting according to the requirement for the V2X service for each user equipment of the group of user equipment.

20. The network according to claim 19, wherein the method carried out by the network further comprises:
- transmitting an acknowledgment message to an entity that controls the V2X service.

21. The network according to claim 19, wherein the method carried out by the network further comprises:
- transmitting, to the entity controlling the V2X service, a context information of a radio access network (RAN); and/or
- sending, to the entity controlling the V2X service, events for the RAN.

22. The network according to claim 19, wherein the method carried out by the network further comprises:
- sending, to the entity controlling the V2X service, context information of a radio access network (RAN), and/or events for the RAN, and/or events for a core network entity;
- receiving, from the entity controlling the V2X service, extended QoS rules for different states of the V2X service; and
- transmitting, to the user equipment of the group of user equipment, the extended QoS rules.

23. A method for supporting a vehicle-to-everything (V2X) service for multiple user equipment, wherein the multiple user equipment are clustered into a group of user equipment, and wherein the V2X service for the multiple user equipment is a V2X service for the group of user equipment, the method comprising:
- receiving, from an entity controlling the V2X service, an adaptation request message comprising a requirement for the V2X service for each user equipment of the group of user equipment, wherein the requirement comprises a resource requirement or a quality of service (QoS); and
- adapting according to the requirement for the V2X service for each user equipment of the group of user equipment.

* * * * *

UNITED STATES PATENT AND TRADEMARK OFFICE
CERTIFICATE OF CORRECTION

PATENT NO. : 11,722,864 B2
APPLICATION NO. : 16/997636
DATED : August 8, 2023
INVENTOR(S) : Pateromichelakis et al.

Page 1 of 1

It is certified that error appears in the above-identified patent and that said Letters Patent is hereby corrected as shown below:

On the Title Page

Page 2: U.S. Patent Documents, Column 1, Line 1: "Atari" should read -- Atarius et al. --.

Signed and Sealed this
Fifth Day of December, 2023

Katherine Kelly Vidal
*Director of the United States Patent and Trademark Office*